United States Patent [19]
Hoff et al.

[11] Patent Number: 5,283,786
[45] Date of Patent: Feb. 1, 1994

[54] BURST ARCHITECTURE TIME-DIVISION SWITCH AND EQUIPMENT ACCESS MODULE FOR USE IN A SWITCH OF THIS KIND

[75] Inventors: Jean Hoff, Saint Jean Saverne; René Graouer, Strasbourg, both of France

[73] Assignee: Alcatel N.V., Amsterdam, Netherlands

[21] Appl. No.: 796,060

[22] Filed: Nov. 20, 1991

[30] Foreign Application Priority Data
Nov. 21, 1990 [FR] France .................. 90 14525

[51] Int. Cl.$^5$ .............................. H04J 3/02
[52] U.S. Cl. ....................... 370/67; 370/66;
370/79; 370/85.7; 370/85.9; 370/85.11;
370/85.13
[58] Field of Search ............ 370/66, 67, 68, 79,
370/85.7, 85.9, 85.11, 95.1, 85.13

[56] References Cited
U.S. PATENT DOCUMENTS

| | | | |
|---|---|---|---|
| 3,856,993 | 12/1974 | Closs et al. ........................ | 179/15 |
| 4,569,040 | 2/1986 | O'Toole et al. .................... | 370/66 X |
| 4,656,626 | 4/1987 | Yudichak et al. .................. | 370/68 |
| 4,665,515 | 5/1987 | Gilén et al. ........................ | 370/67 |
| 4,674,083 | 6/1987 | Rackin ............................... | 370/67 |
| 4,809,270 | 2/1989 | Baxter et al. ...................... | 370/85.7 |

OTHER PUBLICATIONS

I. Andersson, et al., "Hugin-A High Speed Unibus Group Selector For Integrated Digital Networks", Int'l. Switching Symposium, Kyoto, Jap., Oct. 25-29, 1976, pp. 1-6.

Primary Examiner—Douglas W. Olms
Assistant Examiner—Russell W. Blum
Attorney, Agent, or Firm—Robbins, Berliner & Carson

[57] ABSTRACT

Time-division switch under the control of a control arrangement in which at least one processor (3) and a clock (4) are associated and including a data bus (5) operation of which is time-shared between equipment access modules (2A to 2E) which are connected to said data bus. Each unit is provided with two content-addressable memories (6A to 6E, 7A to 7E) which are dynamically programmed by the control arrangement to send and to receive data with different frame structures during time slots the number and temporal positions of which are defined by said control arrangement on the data bus and on a particular time-division multiplex link (1A to 1E) linking the relevant equipment access module to the item of equipment it serves.

9 Claims, 2 Drawing Sheets

BURST ARCHITECTURE TIME-DIVISION SWITCH AND EQUIPMENT ACCESS MODULE FOR USE IN A SWITCH OF THIS KIND

TECHNICAL FIELD

The invention concern a burst architecture time-division switch and an equipment access module for use in a switch of this kind.

BACKGROUND ART

The development of digital techniques for processing all kinds of information and the installation of telecommunication networks enabling transmission of digital information at high throughputs has resulted in the introduction of a great variety of communication terminals which are adapted to be connected to a common type of telecommunication network to transmit on it at the same time and in particular digital forms information that may be of a highly diversified nature.

This variety in the nature of the information and the variety of user requirements in respect of information of the same kind has led to the design and implementation of telecommunication networks enabling the simultaneous presence and communication of terminals having transmission characteristics which, while necessarily compatible, may be very different, especially in terms of throughput.

In one known form of implementation telephone type telecommunication networks are built up using time-division switches interconnected by standardized time-division multiplex links, in particular links in accordance with Recommendation G.704 of the Comité Consultatif International Télégraphique et Téléphonique (CCITT).

This recommendation defines various synchronization frame structures adapted to enable the transfer of digital signals arranged in the form of octets and in particular a frame structure catering for a throughput of 2.048 Mbit/s on a unidirectional link using 32 isochronous channels. Each channel is in corresponding relationship to a time slot of the same particular rank during each of the consecutive phases timing the synchronous operation of a link, the frame period being 125 $\mu$s.

In a conventional implementation all the time-division switch inputs are designed to receive a time-division multiplex link as described above and the same applies to all the outputs while the control structure of a switch is designed taking into account the number of channels provided per link according to the standards.

This has the drawback that it does not always enable optimum operation of a switch when there are disparate requirements in terms of numbers of link channels and terminals connected to its ports, the assignment of the available channels being not entirely unrestricted.

DISCLOSURE OF INVENTION

The invention therefore proposes a time-division switch and an equipment access module for use in a switch of this kind.

The time-division switch is under the control of a control arrangement in which at least one processor and a clock are associated. According to one feature of the invention, it includes a data bus, the synchronous operation of which being time-shared between equipment access modules which are connected to the data bus and which are each provided with two content-addressable memories which are dynamically programmed by the control arrangement to send and to receive data with different frame structures during time slots the number and temporal positions of which are defined by the control arrangement on the data bus and on a particular time-division multiplexed link linking the relevant equipment access module to the item of equipment it serves.

As mentioned above, the invention proposes also a module for connecting an item of equipment to a time-division multiplex link forming a data bus organized in accordance with a first frame structure and shared between a plurality of identical equipment access modules serving items of equipment by means of individual time-division multiplex links the frame structure of which is different from said first structure, synchronous operation of this data bus being supervised by a control structure comprising at least a processor and a clock.

According to one feature of the invention, the module includes two content-addressable memories respectively adapted to send from the module to the data bus and to send to the module via the data bus, said two memories each including, in an identical fashion, two time slot selection portions which are under the control of the control arrangement and each operated by a different counter respectively controlled by the clock signals currently in use on the data bus and by the clock signals currently in use on the particular link being served, as well as a data buffer portion inserted between the particular link being served and the data bus and selectively controlled by each selection portion either in write or in read mode depending on the relevant direction of sending.

BRIEF DESCRIPTION OF DRAWINGS

The invention, its features and its advantages will be explained in the following description given with reference to the figures listed below.

BEST MODE FOR CARRYING OUT THE INVENTION

Figure 1:
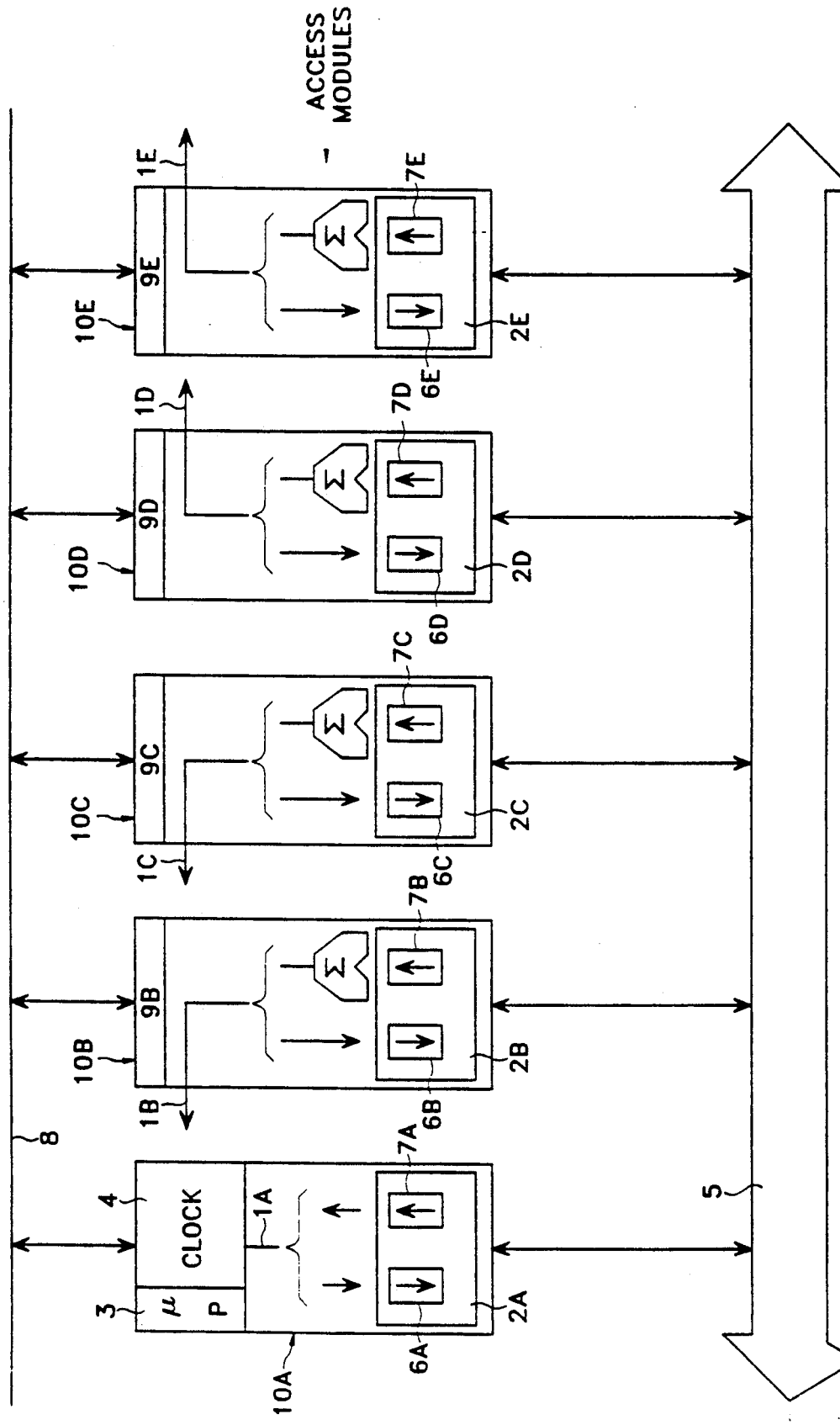
FIG. 1 shows a block diagram of a burst architecture time-division switch system.

The system shown in FIG. 1 represents, for example, a digital switch for a private telephone installation and is assumed to serve telephone equipments connected to the switch by various digital transmission links and transmission links digitized on arrival which are denoted 1A through 1E in FIG. 1.

Some of the links are, for example, time-division multiplex links conforming to the Recommendation G.704 mentioned above. Others may be time-division multiplex links having a different frame structure.

Each link is adapted to serve one item of equipment, for example a remote switch line interface circuit or a local control arrangement. It terminates at an equipment access module in the local time-division switch shown here.

Thus the time-division multiplex link 1A shown in FIG. 1 is assumed to connect a local equipment access module 2A to the control arrangement of the local time-division switch, this control arrangement being generally organized in a conventional way based on at least one processor 3 and a local clock 4.

The other time-division multiplex links denoted 1B through 1E are assumed to connect local equipment access modules 2B through 2E to complementary equipment access modules usually remotely sited from the equipment served, these complementary modules and the equipment served not being shown.

All the local equipment access modules 2A through 2E are connected to the same time-division multiplex link which is a bidirectional data bus 5 to enable exchange of data on the data bus 5 between the equipments that they respectively serve.

To this end the data bus 5 is managed by a control structure comprising in this instance the control arrangement mentioned above which, as explained, is based on at least one processor 3 and a clock 4, although it should be understood that other known structures not described here may equally well be used.

The synchronous multiwire data bus 5 transmits several bits of the same item of information simultaneously, in this instance all the bits of one octet.

This data bus supports a frame structure catering for a large number of isochronous channels, for example a structure whereby each periodic frame of 125 $\mu$s duration is divided into 256 time slots, and enables the use of the same number of isochronous channels and consequently the servicing of a plurality of equipment access modules connected to their respective equipments by time-division multiplex links supporting frame structures in which the number of channels is very much lower than 256 (in this example), for example 32 channels per link.

The digital data to be exchanged by the equipments served by the data bus 5 is transmitted by the local equipment access modules 2A through 2E concerned, these comprising to this end two content-addressable memories connected to the data bus 5 and to the multiplex link terminating at the equipment access unit in question, such as the content-addressable memories 6A and 7A connected to the data bus 5 and to the link 1A in the case of the equipment access module 2A.

As mentioned above, it is the control arrangement, in this example assumed to be based on the processor 3 and the clock 4, which is responsible for managing the burst architecture time-division switch that the data bus 5 and the equipment access modules 2A through 2E constitute.

To this end the processor 3 is connected by an auxiliary signalling bus 8 to each of the local equipment access modules 2B through 2E connected to the data bus 5, for example via the control logic 9B through 9E associated with each equipment access module 2B through 2E in the local unit 10B through 10E of which this module is part.

The processor 4 is in this example responsible for dynamic assignment of the time channels and consequently of the time slots to the various equipment access modules on the data bus 5 according to requirements, the clock 3 supplying the corresponding timing signals in a manner familiar to the man skilled in the art.

Setting up a call between a local unit 10B, for example, and another local unit 10E, for example, involves the logic 9B of the requesting local unit sending a call request to the processor 4 via the auxiliary signalling bus 8.

The processor 4 temporarily assigns one or more isochronous channels of the data bus 5 to the equipment access module 2B for sending via its content-addressable memory 6B on the basis of a configuration table in which are stored the nominal transmit channel requirements of all the equipment access modules and according to the channels, that is to say the time slots on the data bus 5 which are then busied for sending by other equipment access modules.

Figure 2:
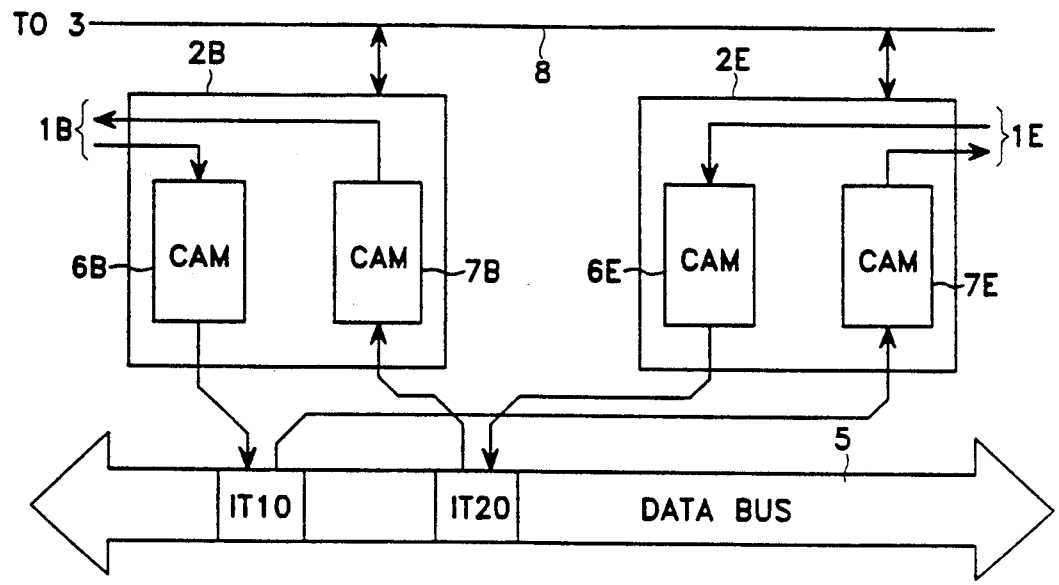
FIG. 2 shows a functional block diagram relating to the switch from FIG. 1.
Figure 3:
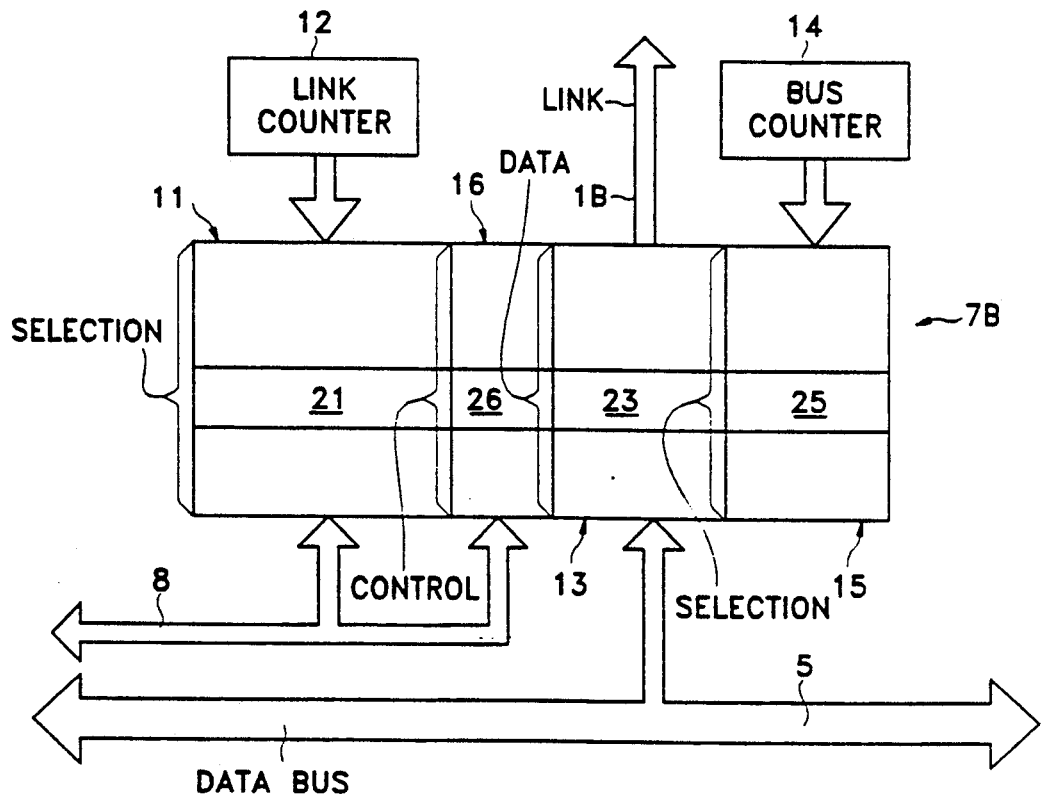
FIG. 3 shows a block diagram of an equipment access module in accordance with the invention.

The channel(s) reserved for sending by the equipment access module 2B via its content-addressable memory 6B, such as the channel corresponding to the time slot IT10 in FIG. 2, is also indicated to the receiving equipment access module 2E by the processor 4 for reception of the corresponding data via the content-addressable memory 7E.

The same operations are undertaken to report to the equipment access module 2E and to the equipment access module 2B the time slots assigned to sending from the former to the latter via the respective content-addressable memories 6E and 7B of these modules, such as the time slot IT20 in FIG. 2.

FIG. 2 shows one example 7B of an content-addressable memory 7 for an equipment access module in accordance with the invention. It is adapted to transfer data transmitted by the data bus 5 to which the content-addressable memory is connected to the specific time-division multiplex link 1 (1B in this instance) connecting the equipment access module in question to the equipment that it serves.

To this end the content-addressable memory 7B comprises a time slot selection portion 11 essentially comprising a plane of "n" comparator registers of which only the register 21 is shown. These are adapted to detect the occurrence of particular time slots during successive identical frames on the data bus 5.

The selection portion 11 is connected to the processor 3 by the auxiliary signalling bus 8 and it receives from the processor indications relating to the time slots assigned to an equipment access module entering into communication with the equipment access module which incorporates it via the data bus 5.

Each time slot indication is saved for the duration of the call in one comparator register 21 of the portion 11.

A counter 12 and a decoder (not shown) are associated with the content-addressable memory 7B to scan cyclically through all time slot indications for the frame present on the data bus 5. To this end it is synchronized by the clock signals supplied by the clock 4 which controls this bus.

Each of the registers 21 of the selection portion 11 which contains a time slot indication compares the indications supplied successively by the counter 12 with this indication that it stores to enable capture by the equipment access module 2B of the data transmitted to this module on the data bus 5 during the indicated time slot.

To this end the content-addressable memory 7B comprises a data buffer portion 13 also made up of "n" registers 23 each adapted to store at least the data transmitted by the data bus to an equipment access module during a time slot, for example one octet.

Each of the registers 23 of the data buffer portion 13 is connected to the data bus 5 by its data inputs and is activated in write mode by one of the registers 21 of the selection portion 11 when the latter detects the arrival of the time slot specifically indicated to it by the processor 3.

A second counter 14 controls the reading of data contained in the buffer portion 13 in association with a second time slot selection portion 15, in a similar manner to that explained for the counter 12 and the first selection portion 11 of the content-addressable memory 7B in question.

The counter 14 is clocked by the clock signals present on the specific multiplex link 1B served which are obtained by means of a conventional clock recovery device (not shown).

The second time slot selection unit 15 is identical to the first and therefore comprises a plane of "n" comparator registers 25 of which only one is individually identified here. These registers 25 are adapted to detect the occurrence of specific time slots during successive identical frames present of the specific time-division multiplex link 1B.

The second selection portion 15 is connected to the processor 3 by the auxiliary signalling bus 8 and it receives from this processor the indication(s) relating to the time slots assigned to the equipments served on the multiplex link 1B for each of its communications with the equipment access module which includes this selection unit 15.

Each time slot indication is saved for the duration of the call in a comparator register 25 of the unit 15.

The operation of the combination of a selection portion 15 and a counter 14 associated with it in the same content-addressable memory is similar to that of the combination of a selection portion 11 and the associated counter 12 and there is therefore no need to describe it again.

A control buffer portion 16 is also included in the content-addressable memory 7B. It comprises "n" control registers 56 of which only one is individually identified here. The registers 26 are individually associated with the registers of the data buffer portion 13 as are the registers of the selection portions 11 and 15.

Each register of the portion 16 is connected to the processor 3 by the auxiliary signalling bus 8 so as to receive control indications which indicate the operations to be carried out at the corresponding register of the data buffer unit.

These control indications enable the processor 3 to write into the control buffer register 25 concerned connection or disconnection instructions concerning the corresponding channels of the specific multiplex link 1B, for example.

In a manner which is conventional in this field, the operation of an content-addressable memory such as the memory 6B is readily deduced from that of the corresponding content-addressable memory 7B of the same equipment access module 2B because reversing the direction of data transmission by these identical memories in practice merely reverses the operating processes.

We claim:

1. Time-division switch comprising:
   a control arrangement further comprising
      at least one processor and
      a clock;
   a time-shared synchronous data bus; and
   a plurality of equipment access modules which are each connected to said data bus and which are each associated with a respective item of equipment and which each further comprises
      a multiplex link linking the equipment access module to its respective item of equipment,
      a bus counter clocked by clock signals currently in use on the data bus,
      a link counter clocked by clock signals currently in use on the multiplex link, and
      send and receive content-addressable memories dynamically programmed by the control arrangement to send data on the data bus from its said multiplex link and receive data on said multiplex link from the data bus, using respective multiplex link frame structures defined by and time slots selected by said control arrangement, wherein each content-addressable memory further comprises
      two respective time slot selection portions also under the control of the control arrangement and each operated by a respective one of said counters,
      a data buffer portion between the respective multiplex link and the data bus and being selectively controlled by one or the other of said respective selection potions either in write or in read mode depending on the relevant direction of sending, and
      a control buffer portion also under the control of the control arrangement for storing control information relating to channels corresponding to the selected time slots.

2. Time-division switch according to claim 1 wherein the two time slot selection portions, the control buffer portion and the data buffer portion of each of the two content-addressable memories of a given equipment access module each include a same number of registers which is at least equal to a number of time slots of the frame governing the particular link served by the relevant equipment access module.

3. Time-division switch according to claim 2 wherein each time slot selection portion of the two content-addressable memories of a particular said equipment access module includes a number of comparator registers at least equal to the number of time slots in the frame that governs the particular link served by this equipment access module, each of said comparator registers detecting occurrence of a time slot of a determined rank during successive identical frames present either on the data bus or on the particular link being served by comparing indications supplied by a counter synchronized by said clock signals currently being used either on said data bus or on said particular link with a corresponding indication stored in said comparator register by the control arrangement of the time-division switch via a signalling bus.

4. Time-division switch according to claim 1 wherein said control arrangement is linked to the common data bus by an access module which is identical to the other equipment access modules.

5. Module for connecting an item of equipment to a time-division multiplex link forming a data bus organized in accordance with a first frame structure and shared between a plurality of identical or similar equipment access modules serving items of equipment by means of individual time-division multiplex links the frame structure of which is different from said first structure, synchronous operation of this data bus being supervised by a control structure comprising at least a processor and a clock, said module comprising
   a bus counter clocked by clock signals currently in use on the data bus,
   a link counter clocked by clock signals currently in use on the multiplex link, and
   two substantially identical memories respectively adapted to send from the module to the data bus and to send to said module from said data bus, each of said two memories comprising two time slot selection portions which are each under the control of the control arrangement and each addressed by a respective one of said counters, a data buffer portion inserted between the particular link being served and the data bus and selectively controlled by each selection portion either in write or in read mode depending on the relevant direction of sending, and a control buffer portion which is under the control of said control arrangement and which is associated with said data buffer portion in order to store control information relating to the channels which correspond to the selected time slots.

6. Connection module according to claim 5 wherein the two time slot selection portions, the control buffer portion and the data buffer portion of each of the two content-addressable memories of the module include the same number of registers which is at least equal to the number of time slots of the frame governing the particular link served by the module.

7. Connection module according to claim 6 wherein each time slot selection portion of the two content-addressable memories of the module include comparator registers the number of which is at least equal to the number of time slots in the frame that governs the particular link served by this module, each of said comparator registers detecting occurrence of a time slot of a determined rank during successive identical frames present either on the data bus or on the particular link being served by comparing indications supplied by a counter synchronized by the clock signals currently in use either on the data bus or on the particular link with a corresponding indication stored in said comparator register by the control arrangement.

8. Connection module according to claim 5 wherein each time slot selection portion of the two content-addressable memories of the module include comparator registers the number of which is at least equal to the number of time slots in the frame that governs the particular link served by this module, each of said comparator registers detecting occurrence of a time slot of a determined rank during successive identical frames present either on the data bus or on the particular link being served by comparing indications supplied by a counter synchronized by the clock signals currently in use either on the data bus or on the particular link with a corresponding indication stored in said comparator register by the control arrangement.

9. Time-division switch according to claim 1 wherein each time slot selection portion of the two content-addressable memories of an equipment connection module includes comparator registers the number of which is at least equal to the number of time slots in the frame that governs the particular link served by this equipment access module, each of said comparator registers detecting occurrence of a time slot of a determined rank during successive identical frames present either on the data bus or on the particular link being served by comparing indications supplied by a counter synchronized by said clock signals currently being used either on said data bus or on said particular link with a corresponding indication stored in said comparator register by the control arrangement of the time-division switch via a signalling bus.

* * * * *